(12) United States Patent
Liu et al.

(10) Patent No.: US 11,978,215 B2
(45) Date of Patent: May 7, 2024

(54) DEVICE AND METHOD FOR GLAUCOMA AUXILIARY DIAGNOSIS, AND STORAGE MEDIUM

(71) Applicant: Ping An Technology (Shenzhen) Co., Ltd., Guangdong (CN)

(72) Inventors: Yang Liu, Guangdong (CN); Chengfen Zhang, Guangdong (CN); Bin Lv, Guangdong (CN); Chuanfeng Lv, Guangdong (CN)

(73) Assignee: Ping An Technology (Shenzhen) Co., Ltd., Guangdong (CN)

( * ) Notice: Subject to any disclaimer, the term of this patent is extended or adjusted under 35 U.S.C. 154(b) by 412 days.

(21) Appl. No.: 17/539,860

(22) Filed: Dec. 1, 2021

(65) Prior Publication Data

US 2022/0130052 A1   Apr. 28, 2022

Related U.S. Application Data

(63) Continuation of application No. PCT/CN2020/132269, filed on Nov. 27, 2020.

(30) Foreign Application Priority Data

Oct. 26, 2020   (CN) .......................... 202011154892.2

(51) Int. Cl.
*G06T 7/143*   (2017.01)
*G06T 7/194*   (2017.01)

(52) U.S. Cl.
CPC .............. *G06T 7/143* (2017.01); *G06T 7/194* (2017.01); *G06T 2207/10024* (2013.01);
(Continued)

(58) Field of Classification Search
None
See application file for complete search history.

(56) References Cited

U.S. PATENT DOCUMENTS

2018/0108139 A1   4/2018   Abramoff et al.
2022/0047159 A1*  2/2022   Xiong .................. A61B 3/0025

FOREIGN PATENT DOCUMENTS

CN   108520522 A   9/2018
CN   109684981 A   4/2019
(Continued)

OTHER PUBLICATIONS

CNIPA, International Search Report for International Patent Application No. PCT/CN2020/132269, Jun. 25, 2021, 5 pages.
(Continued)

*Primary Examiner* — Leon Flores
(74) *Attorney, Agent, or Firm* — IP Spring

(57) ABSTRACT

A device and method for glaucoma auxiliary diagnosis, and a non-transitory storage medium are provided. The device includes an obtaining unit and a processing unit. The obtaining unit is configured to obtain a color fundus image of a patient. The processing unit is configured to perform feature extraction on the color fundus image to obtain a first feature map. The processing unit is further configured to perform image segmentation on the color fundus image according to the first feature map to obtain an optic disc image in the color fundus image, where the optic disc image corresponds to an optic disc area in the color fundus image. The processing unit is further configured to perform feature extraction on the optic disc image and the color fundus image according to the first feature map to obtain a probability that the patient has glaucoma.

17 Claims, 5 Drawing Sheets

(52) U.S. Cl.
 CPC ............... *G06T 2207/20081* (2013.01); *G06T 2207/20084* (2013.01); *G06T 2207/30041* (2013.01)

(56) References Cited

FOREIGN PATENT DOCUMENTS

| | | |
|---|---|---|
| CN | 109919938 A | 6/2019 |
| CN | 110610480 A | 12/2019 |
| CN | 110992382 A | 4/2020 |
| CN | 111553754 A | 8/2020 |
| CN | 111986202 A | 11/2020 |
| WO | 2018215855 A1 | 11/2018 |

OTHER PUBLICATIONS

CNIPA, Office Action for Chinese Patent Application No. 202011154892.2, Dec. 2, 2020, 12 pages.

* cited by examiner

DEVICE AND METHOD FOR GLAUCOMA AUXILIARY DIAGNOSIS, AND STORAGE MEDIUM

CROSS-REFERENCE TO RELATED APPLICATION(S)

This application is a continuation under 35 U.S.C. § 120 of International Application No. PCT/CN2020/132269, filed on Nov. 27, 2020, which claims priority under 35 U.S.C. § 119(a) and/or PCT Article 8 to Chinese Patent Application No. 202011154892.2, filed on Oct. 26, 2020, the entire disclosures of which are hereby incorporated by reference.

TECHNICAL FIELD

This disclosure relates to the technical field of image recognition, and particularly to a device and method for glaucoma auxiliary diagnosis, and a storage medium.

BACKGROUND

Glaucoma is the second leading cause of irreversible blindness worldwide. Glaucoma generally causes no obvious symptoms early in its course, which leads to late detection. As a result, it is easy to cause irreparable damage and even permanent blindness. The inventor found that in medicine, diagnosing whether to have glaucoma and the severity of glaucoma is generally based on morphological and structural changes of optic disc and optic cup in a color fundus image. As an example, the color fundus image can be segmented to obtain optic cup and optic disc, and then whether to have glaucoma can be determined based on a ratio of the optic cup to the optic disc. If the ratio is greater than 0.6, it is determined to have glaucoma.

However, the inventor realized that different people have different body structures, and some people may have a relatively large ratio of optic cup to optic disc. As a result, accuracy of determining whether to have glaucoma based on the ratio of the optic cup to the optic disc is relatively low, which may lead to misdiagnosis.

SUMMARY

In a first aspect of the disclosure, a method for glaucoma auxiliary diagnosis is provided. A color fundus image of a patient is obtained. Feature extraction is performed on the color fundus image to obtain a first feature map. Image segmentation is performed on the color fundus image according to the first feature map to obtain an optic disc image in the color fundus image, where the optic disc image corresponds to an optic disc area in the color fundus image. Feature extraction is performed on the optic disc image and the color fundus image according to the first feature map, to obtain a probability that the patient has glaucoma.

In a second aspect of the disclosure, a device for glaucoma auxiliary diagnosis is provided. The device includes a processor, a memory, a communication interface, and one or more programs. The one or more programs are stored in the memory and configured to be executed by the processor. The one or more programs cause the processor to carry out the following actions. A color fundus image of a patient is obtained. Feature extraction is performed on the color fundus image to obtain a first feature map. Image segmentation is performed on the color fundus image according to the first feature map to obtain an optic disc image in the color fundus image, where the optic disc image corresponds to an optic disc area in the color fundus image. Feature extraction is performed on the optic disc image and the color fundus image according to the first feature map, to obtain a probability that the patient has glaucoma.

In a third aspect of the disclosure, a non-transitory computer-readable storage medium is provided. The non-transitory computer-readable storage medium stores computer programs which, when executed by a processor, cause the processor to carry out all or part of the operations of the method in the first aspect of the disclosure.

BRIEF DESCRIPTION OF THE DRAWINGS

In order to describe technical solutions of implementations of the disclosure more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

Figure 1:
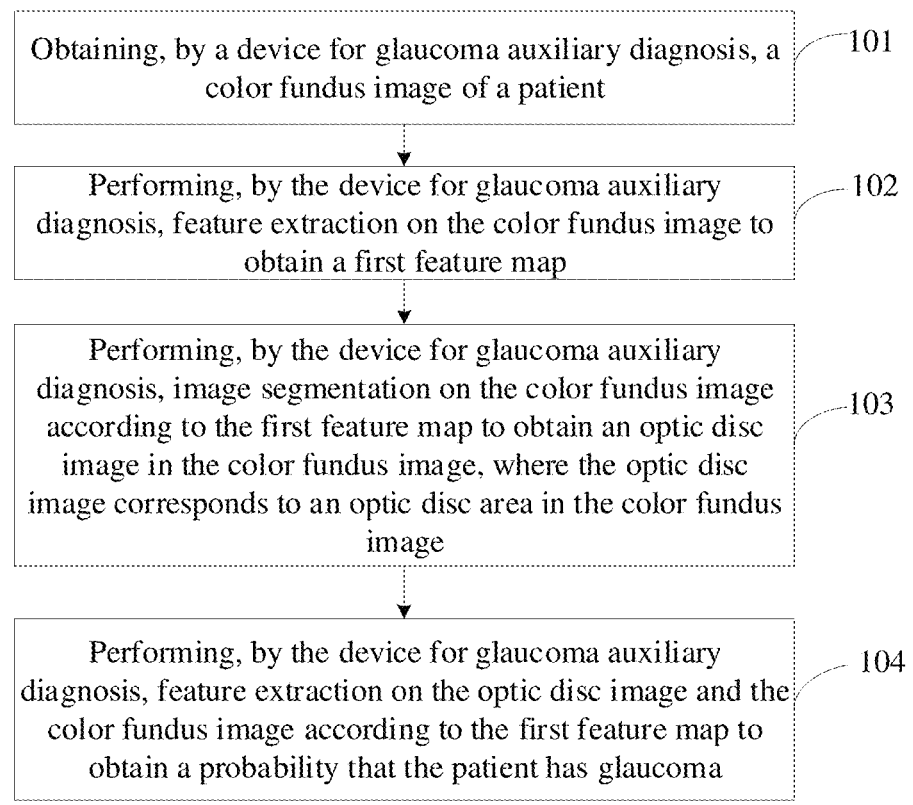
FIG. 1 is a schematic flowchart illustrating a method for glaucoma auxiliary diagnosis provided in implementations of the disclosure.

Hereinafter, technical solutions of implementations of the disclosure will be described in a clear and comprehensive manner with reference to accompanying drawings intended for the implementations. It is evident that the implementations described herein constitute merely some rather than all the implementations of the disclosure. Those of ordinary skill in the art will be able to derive other implementations based on these implementations without making creative efforts, which all such derived implementations shall all fall within the protection scope of the disclosure.

The terms "first", "second", "third", "fourth", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps or units is not limited to the listed steps or units, on the contrary, it can optionally include other steps or units that are not listed; alternatively, other steps or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

The technical solutions of the disclosure may be applicable to the technical field of artificial intelligence, smart city, digital healthcare, and/or block-chain, to achieve smart medical care. Optionally, data involved in the disclosure, such as an image and/or a probability, may be stored in a database or block-chain (e.g., distributed storage through the block-chain), which is not limited in the disclosure.

According to implementations of the disclosure, a device and method for glaucoma auxiliary diagnosis, and a storage medium are provided. A color fundus image is recognized through feature extraction, which can improve accuracy in glaucoma recognition.

According to implementations of the disclosure, a device for glaucoma auxiliary diagnosis is provided. The device includes an obtaining unit and a processing unit. The processing unit is configured to perform feature extraction on the color fundus image to obtain a first feature map. The processing unit is further configured to perform image segmentation on the color fundus image according to the first feature map to obtain an optic disc image in the color fundus image, where the optic disc image corresponds to an optic disc area in the color fundus image. The processing unit is further configured to perform feature extraction on the optic disc image and the color fundus image according to the first feature map, to obtain a probability that the patient has glaucoma.

According to implementations of the disclosure, a method for glaucoma auxiliary diagnosis is provided. A color fundus image of a patient is obtained. Feature extraction is performed on the color fundus image to obtain a first feature map. Image segmentation is performed on the color fundus image according to the first feature map to obtain an optic disc image in the color fundus image, where the optic disc image corresponds to an optic disc area in the color fundus image. Feature extraction is performed on the optic disc image and the color fundus image according to the first feature map, to obtain a probability that the patient has glaucoma.

According to implementations of the disclosure, a device for glaucoma auxiliary diagnosis is provided. The device includes a processor, a memory, a communication interface, and one or more programs. The one or more programs are stored in the memory and configured to be executed by the processor. The one or more programs cause the processor to carry out the following actions. A color fundus image of a patient is obtained. Feature extraction is performed on the color fundus image to obtain a first feature map. Image segmentation is performed on the color fundus image according to the first feature map to obtain an optic disc image in the color fundus image, where the optic disc image corresponds to an optic disc area in the color fundus image. Feature extraction is performed on the optic disc image and the color fundus image according to the first feature map, to obtain a probability that the patient has glaucoma.

According to implementations of the disclosure, a computer-readable storage medium is provided. The computer-readable storage medium stores computer programs. The computer programs cause a computer to carry out the following actions. A color fundus image of a patient is obtained. Feature extraction is performed on the color fundus image to obtain a first feature map. Image segmentation is performed on the color fundus image according to the first feature map to obtain an optic disc image in the color fundus image, where the optic disc image corresponds to an optic disc area in the color fundus image. Feature extraction is performed on the optic disc image and the color fundus image according to the first feature map, to obtain a probability that the patient has glaucoma.

According to implementations of the disclosure, a computer program product is provided. The computer program product includes a non-transitory computer-readable storage medium configured to store computer programs. The computer programs are operable with a computer to perform the method of the first aspect.

In the implementations of the disclosure, the color fundus image and the optic disc image each are classified, and whether the patient has glaucoma is determined according to classification results. Since whether the patient has glaucoma is determined by classifying essential features extracted from the images, misdiagnosis due to individual differences will not occur, thereby improving recognition accuracy. Furthermore, in the classification, the entire fundus information (i.e., the color fundus image) and the detailed information of the optic disc (i.e., the optic disc image) are considered together, that is, the classification is based on multiple dimensions of information, which improves accuracy of a diagnosis result.

FIG. 1 is a schematic flowchart illustrating a method for glaucoma auxiliary diagnosis provided in implementations of the disclosure. The method is applicable to a device for glaucoma auxiliary diagnosis. The method includes the following.

At 101, the device for glaucoma auxiliary diagnosis obtains a color fundus image of a patient.

At 102, the device for glaucoma auxiliary diagnosis performs feature extraction on the color fundus image to obtain a first feature map.

Exemplary, the first feature map is obtained by performing feature extraction on the color fundus image with a first network trained. A training process of the first network will be described in detail below, which will not be described herein.

At 103, the device for glaucoma auxiliary diagnosis performs image segmentation on the color fundus image according to the first feature map to obtain an optic disc image in the color fundus image, where the optic disc image corresponds to an optic disc area in the color fundus image.

Optionally, during the segmentation of the color fundus image, an optic cup image can also be segmented from the color fundus image. The optic cup image corresponds to an optic cup area in the color fundus image. In the disclosure, for example, the optic disc image and the optic cup image are obtained by segmentation, so as to illustrate a segmentation process of the color fundus image.

Exemplary, upsampling is performed on the first feature map to obtain a second feature map. Image segmentation is performed according to the second feature map to obtain a first probability segmentation map, a second probability segmentation map, and a third probability segmentation map. The first probability segmentation map is used to represent a probability that each pixel in the color fundus image belongs to the background. The second probability segmentation map is used to represent a probability that each pixel in the color fundus image belongs to optic disc. The third probability segmentation map is used to represent a probability that each pixel in the color fundus image belongs to optic cup.

Further, pixels belonging to the background in the color fundus image and pixels belonging to the optic disc in the color fundus image are determined according to the first probability segmentation map and the second probability segmentation map. Exemplary, for each pixel in the color fundus image: a probability that the pixel in the first probability segmentation map belongs to the background and a probability that the pixel in the second probability segmentation map belongs to the optic disc are obtained; if the probability that the pixel belongs to the background is greater than the probability that the pixel belongs to the optic disc, the pixel is determined to belong to the background; if the probability that the pixel belongs to the background is less than the probability that the pixel belongs to the optic disc, the pixel is determined to belong to the optic disc. Then the optic disc image is segmented from the color fundus image, according to the pixels belonging to the background in the color fundus image and the pixels belonging to the optic disc in the color fundus image.

Further, the optic disc image is further segmented to obtain the optic cup image. Exemplary, pixels belonging to the optic cup in the optic disc image are determined according to the second probability segmentation map and the third probability segmentation map. Similarly, for each pixel in the optic disc image: if a probability that the pixel belongs to the optic cup is greater than a probability that the pixel belongs to the optic disc, the pixel is determined to belong to the optic cup; otherwise, the pixel is determined to belong to the optic disc. Finally, the optic cup image is segmented from the optic disc image according to the pixels belonging to the optic cup in the optic disc image.

As can be seen, the optic disc image is obtained by segmentation and then the optic cup image is segmented from the optic disc image, because the optic cup belongs to the optic disc according to the prior knowledge. Therefore, by adopting a segmentation method of the disclosure, determining a pixel belonging to the optic cup from an area other than the optic disc can be avoided, thereby improving segmentation accuracy.

Exemplary, in practice, the optic disc image and the optic cup image can be segmented from the color fundus image according to the first probability segmentation map, the second probability segmentation map, and the third probability segmentation map. As an example, for each pixel in the color fundus image, whether the pixel belongs to the background, the optic disc, or the optic cup is determined according to the first probability segmentation map, the second probability segmentation map, and the third probability segmentation map. That is, a category corresponding to the maximum probability among three probabilities (i.e., a probability that the pixel in the first probability segmentation map belongs to the background, a probability that the pixel in the second probability segmentation map belongs to the optic disc, and a probability that the pixel in the third probability segmentation map belongs to the optic cup) is used as the category of the pixel. In this way, the pixels belonging to the background in the color fundus image, the pixels belonging to the optic disc in the color fundus image, and the pixels belonging to the optic cup in the color fundus image are determined. Finally, the optic disc image and the optic cup image are segmented from the color fundus image according to the pixels belonging to the background in the color fundus image, the pixels belonging to the optic disc in the color fundus image, and the pixels belonging to the optic cup in the color fundus image.

At 104, the device for glaucoma auxiliary diagnosis performs feature extraction on the optic disc image and the color fundus image according to the first feature map to obtain a probability that the patient has glaucoma.

Exemplarily, the probability that the patient has glaucoma can be displayed to a doctor on a visual interface, to assist the doctor in determining whether the patient has glaucoma.

In one implementation of the disclosure, feature extraction is performed on the optic disc image and the color fundus image according to the first feature map to obtain a target probability that the patient has glaucoma. The target probability is used as the probability that the patient has glaucoma.

Specifically, the first feature map is mapped to obtain an attention weight matrix, where the attention weight matrix has a same dimension as the color fundus image. Since the first feature map is obtained by performing feature extraction on the color fundus image, a value of element $a_{ij}$ in the $i^{th}$ row and the $j^{th}$ column of the attention weight matrix represents the degree of importance of a pixel (in the $i^{th}$ row and the $j^{th}$ column of the color fundus image) in glaucoma recognition. The mapping herein may be implemented by bilinear interpolation upsampling, which will not be described in detail.

Therefore, weighting processing on the color fundus image is performed according to the attention weight matrix, that is, a dot product between the attention weight matrix and a gray value matrix corresponding to the color fundus image is calculated, so as to obtain the first input data.

Exemplarily, feature extraction is performed on the first input data to obtain a first target feature vector. A first probability that the patient has glaucoma is determined according to the first target feature vector. That is, classification is performed based on the first target feature vector, to determine the first probability that the patient has glaucoma. The feature extraction and classification of the first input data may be implemented by a second network trained. A training process of the second network will be described in detail below, which will not be described herein.

Since the first input data is obtained after weighting based on the attention weight matrix, effective feature information of the color fundus image can be enlarged (that is, useless feature information is suppressed), and therefore, accuracy of glaucoma recognition based on the first input data can be improved.

Exemplarily, a second probability that the patient has glaucoma is determined according to the optic disc image. Exemplarily, feature extraction is performed on the optic disc image to obtain a second target feature vector corresponding to the optic disc image. The second probability that the patient has glaucoma is determined according to the second target feature vector. That is, classification is performed based on the second target feature vector, to determine the second probability that the patient has glaucoma. The feature extraction and classification of the optic disc image may be implemented by a third network trained. A training process of the third network will be described in detail below, which will not be described herein.

Further, a target probability that the patient has glaucoma is obtained according to the first probability and the second probability. That is, weighting processing is performed on the first probability and the second probability to obtain the target probability.

Finally, whether the patient has glaucoma is determined according to the target probability. If the target probability is greater than 0.5, the patient is determined to have glaucoma; otherwise, the patient is determined to have no glaucoma.

In addition, a ratio of the optic cup image to the optic disc image may further be determined, where the ratio is a ratio of a vertical diameter of the optic cup to a vertical diameter of the optic disc. The vertical diameter of the optic cup is determined according to the optic cup image, and the vertical diameter of the optic disc is determined according to the optic disc image. Then the ratio between the two diameters is calculated. Finally, the probability that the patient has glaucoma can be determined according to the ratio and the target probability. As an example, a product of the ratio and the target probability is used as the probability that the patient has glaucoma. Then whether the patient has glaucoma is determined according to the probability that the patient has glaucoma.

As can be seen, in these implementations, the color fundus image and the optic disc image each are classified, and whether the patient has glaucoma is determined according to classification results. Since whether the patient has glaucoma is determined by classifying essential features extracted from the images, misdiagnosis due to individual differences will not occur, thereby improving recognition accuracy. Furthermore, in the classification, both the entire fundus information and the partial information of the optic disc are considered, that is, the classification is based on multiple dimensions of information, which further improves accuracy of a classification result. In addition, during the classification of the entire fundus information, an attention mechanism is also added. As such, important areas will be focused on during the classification, which is conducive to improving accuracy of a global classification result, thereby indirectly improving accuracy of diagnosis for the patient. Moreover, the probability that the patient has glaucoma is determined by combining a cup-to-disk ratio and a classification result, which further improves the recognition accuracy.

In some implementations, the method further includes the following. Before performing feature extraction on the color fundus image to obtain the first feature map, image transformation is performed on the color fundus image to transform an image parameter of the color fundus image into a standard parameter. The image parameter includes at least one of brightness, saturation, chroma, contrast, or color.

As can be seen, in these implementations, the color fundus image is first subjected to image transformation, to transform the image parameter into the standard parameter, which can avoid misrecognition problems caused by different image parameters.

In one implementation of the disclosure, the method for glaucoma auxiliary diagnosis of the disclosure can also be applicable to the field of smart medical care. As an example, after taking a color photo of fundus of the patient (or a color fundus image of the patient), the method for glaucoma auxiliary diagnosis can be used to initially diagnose whether the patient has glaucoma, and a diagnosis result is displayed to the doctor, so as to provide the doctor with the diagnosis result, which can improve diagnosis efficiency and diagnosis accuracy of the doctor, thereby promoting development of medical technology.

An implementation process of a method for glaucoma auxiliary diagnosis of the disclosure will be described in detail below with reference to network structures of the first network, the second network, and the third network.

The first network is used for image segmentation. Both the second network and the third network are used for image classification. Exemplarily, the first network is any kind of fully convolutional network, such as U-net, V-net, etc. In the disclosure, U-net is taken as an example of the first network for illustration. Both the second network and the third network may be a network having a classification function and including a dense network (e.g., DenseNet) as a backbone network.

Figure 2:
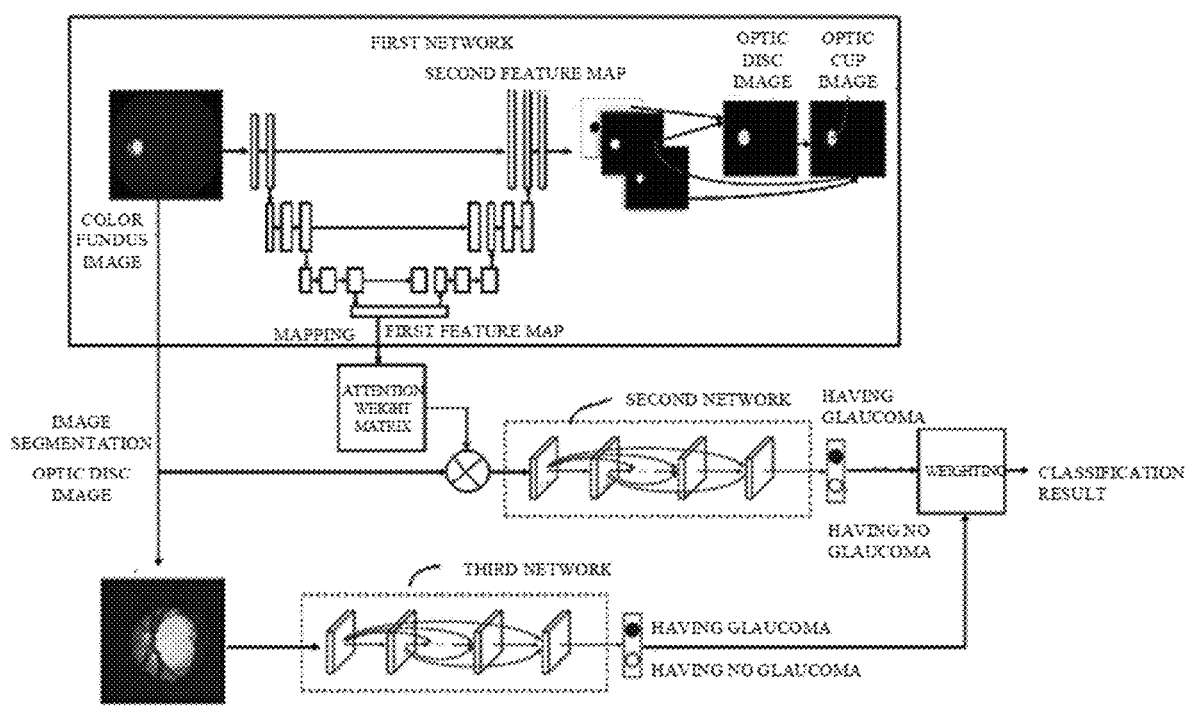
FIG. 2 is a schematic flowchart illustrating a method for glaucoma auxiliary diagnosis with a neural network structure provided in implementations of the disclosure.

Exemplarily, as illustrated in FIG. 2, the first network is U-net which includes multiple convolutional layers, multiple deconvolutional layers, and multiple pooling layers. A color fundus image of a patient is inputted into the U-net to perform multiple convolution and pooling to obtain a first feature map. Multiple deconvolution (upsampling) and pooling are performed on the first feature map to obtain a second feature map. Image segmentation is performed according to the second feature map to obtain a first probability segmentation map, a second probability segmentation map, and a third probability segmentation map. Then an optic disc image is segmented from the color fundus image according to the first probability segmentation map and the second probability segmentation map, and an optic cup image is segmented from the optic disc image according to the second probability segmentation map and the third probability segmentation map.

Further, after obtaining the optic disc image and the optic cup image by segmentation, a ratio of the optic cup image to the optic disc image is determined and outputted, to assist the doctor in glaucoma diagnosis.

Exemplarily, the first feature map is mapped to obtain an attention weight matrix. A dot product between the attention weight matrix and the color fundus image is calculated. A dot-product result (i.e., first input data) is inputted into the second network for classification, to obtain a first probability that the patient has glaucoma.

Exemplarily, according to a segmentation result, the optic disc image can be cut out from the color fundus image. The optic disc image can be inputted into the third network for classification, to obtain a second probability that the patient has glaucoma.

Finally, weighting processing is performed on the first probability and the second probability to obtain a target probability that the patient has glaucoma. A final classification result is determined according to the target probability, that is, whether the patient has glaucoma is determined.

In one implementation of the disclosure, the first network, the second network, and the third network may be trained end-to-end, or may be trained separately. In the disclosure, the first network for example is trained separately, and the second network and the third network for example are trained simultaneously, to illustrate a training process of a neural network.

Figure 3:
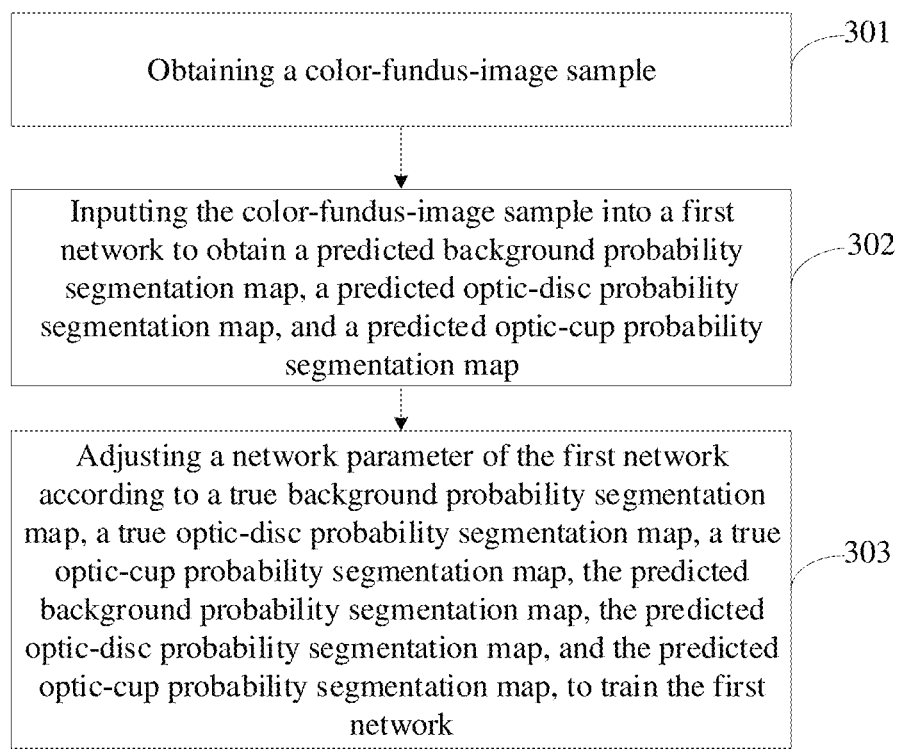
FIG. 3 is a schematic flowchart illustrating a training method of a first neural network provided in implementations of the disclosure.

FIG. 3 is a schematic flowchart illustrating a training method of a first network provided by implementations of the disclosure. The method includes the following.

At 301, a color-fundus-image sample is obtained.

The color-fundus-image sample corresponds to a training label. The training label includes a true background probability segmentation map, a true optic-disc probability segmentation map, and a true optic-cup probability segmentation map. The true background probability segmentation map, the true optic-disc probability segmentation map, and the true optic-cup probability segmentation map are labeled in advance.

At 302, the color-fundus-image sample is inputted into the first network to obtain a predicted background probability segmentation map, a predicted optic-disc probability segmentation map, and a predicted optic-cup probability segmentation map.

At 303, a network parameter of the first network is adjusted according to the true background probability segmentation map, the true optic-disc probability segmentation map, the true optic-cup probability segmentation map, the predicted background probability segmentation map, the predicted optic-disc probability segmentation map, and the predicted optic-cup probability segmentation map, to train the first network.

Exemplarily, first loss is obtained according to the true background probability segmentation map and the predicted background probability segmentation map. Second loss is obtained according to the true optic-disc probability segmentation map and the predicted optic-disc probability segmentation map. Third loss is obtained according to the true optic-cup probability segmentation map and the predicted optic-cup probability segmentation map. Weighting processing is performed on the first loss, the second loss, and the third loss to obtain first target loss. The network parameter of the first network is adjusted according to the first target loss and a gradient descent method, until the first network converges, so as to complete training of the first network.

Exemplarily, the first target loss can be expressed by formula (1) as follows:

$$L_{m1} = \alpha * L_1 + \beta * L_2 + \lambda * L_3; \quad (1)$$

where $L_{m1}$ represents the first target loss; $L_1$ represents the first loss, $L_2$ represents the second loss, and $L_3$ represents the third loss; $\alpha$, $\beta$, and $\lambda$ represent weight coefficients, and $\alpha + \beta + \lambda = 1$.

Exemplarily, loss between any two probability segmentation maps can be expressed by a dice loss function. Accordingly, the first loss, the second loss, and the third loss can be expressed by formula (2) as follows:

$$L_1 = (1 - \text{dice\_coeff}(\text{pred}_{background}, \text{true}_{background}));$$

$$L_2 = (1 - \text{dice\_coeff}(\text{pred}_{optic-disc}, \text{true}_{optic-disc}));$$

$$L_3 = (1 - \text{dice\_coeff}(\text{pred}_{optic-cup}, \text{true}_{optic-cup})); \quad (2)$$

where dice_coeff represents the dice function; $\text{pred}_{background}$ represents the predicted background probability segmentation map, $\text{pred}_{optic-disc}$ represents the predicted optic-disc probability segmentation map, and $\text{pred}_{optic-cup}$ represents the predicted optic-cup probability segmentation map; $\text{true}_{background}$ represents the true background probability segmentation map, $\text{true}_{optic-disc}$ represents the true optic-disc probability segmentation map, and $\text{true}_{optic-cup}$ represents the true optic-cup probability segmentation map.

In one implementation of the disclosure, considering that color fundus images of various companies may differ in color, brightness, and the like due to different imaging devices, in order to prevent differences between image samples from affecting network training, before the network training, image transformation is performed on obtained color-fundus-image samples, to transform an image parameter of each of the color-fundus-image samples into a preset parameter. As such, color-fundus-image samples have no difference in the above-mentioned differences, thereby improving recognition accuracy of the trained network. The image parameter includes at least one of brightness, saturation, chroma, contrast, or color.

Figure 4:
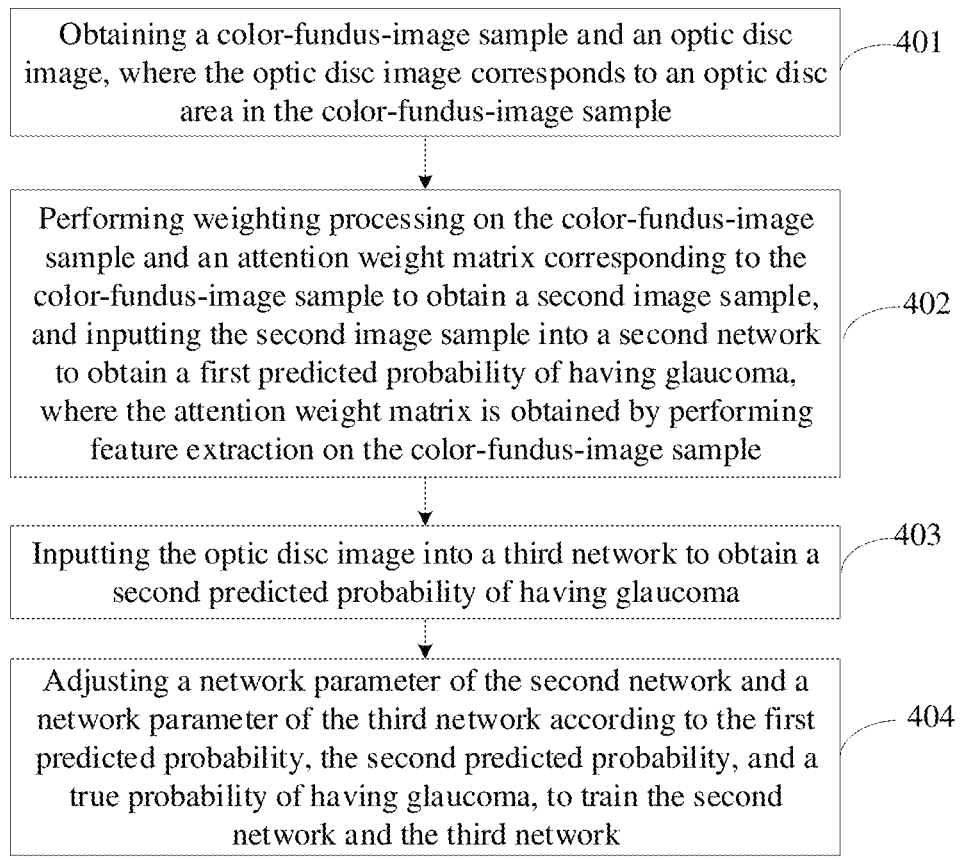
FIG. 4 is a schematic flowchart illustrating a training method of a second neural network and a third neural network provided in implementations of the disclosure.

FIG. 4 is a schematic flowchart illustrating training of a second network and a third network provided in implementations of the disclosure. The method includes the following.

At 401, a color-fundus-image sample and an optic disc image are obtained, where the optic disc image corresponds to an optic disc area in the color-fundus-image sample.

The color-fundus-image sample corresponds to a training label. The training label is a true probability of having glaucoma. The true probability of having glaucoma is labeled in advance.

The optic disc image can be segmented from the color-fundus-image sample by image segmentation. As an example, the optic disc image is obtained by performing image segmentation on the color-fundus-image sample through the first network trained or other networks with an image segmentation function.

At 402, weighting processing is performed on the color-fundus-image sample and an attention weight matrix corresponding to the color-fundus-image sample to obtain a second image sample, and the second image sample is inputted into the second network to obtain a first predicted probability of having glaucoma, where the attention weight matrix is obtained by performing feature extraction on the color-fundus-image sample.

Exemplarily, feature extraction on the color-fundus-image sample is performed through the first network trained or other networks with a feature extraction function, to obtain a third feature map. The third feature map is mapped to obtain the attention weight matrix.

At 403, the optic disc image is inputted into the third network to obtain a second predicted probability of having glaucoma.

At 404, a network parameter of the second network and a network parameter of the third network are adjusted according to the first predicted probability, the second predicted probability, and the true probability of having glaucoma, to train the second network and the third network.

Exemplarily, fourth loss is determined according to the first predicted probability and the true probability. Fifth loss is determined according to the second predicted probability and the true probability. Weighting processing is performed on the fourth loss and the fifth loss to obtain a second target loss. The network parameter of the second network and the network parameter of the third network are adjusted according to the second target loss and a gradient descent method, until the second network and the third network converge, so as to complete training of the second network and the third network.

Exemplarily, the fourth loss and the fifth loss can be expressed by a cross-entropy loss function.

Therefore, the second target loss can be expressed by formula (3) as follows:

$$L_{m2} = \chi * \text{Cross\_entropy}(\text{pred}_{y'_1}, \text{pred}_y) + \delta * \text{Cross\_entropy}(\text{pred}_{y'_2}, \text{true}_y); \quad (3)$$

where $L_{m2}$ represents the second target loss; $\chi$ and $\delta$ represent weight coefficients, and $\chi + \delta = 1$; Cross_entropy represents the cross-entropy loss function; $\text{pred}_{y'_1}$ represents the first predicted probability, $\text{pred}_{y'_2}$ represents the second predicted probability, and $\text{true}_y$ represents the true probability.

In one implementation of the disclosure, considering that color fundus images of various companies may differ in color, brightness, and the like due to different imaging devices, in order to prevent differences between image samples from affecting network training, before the network training, image transformation is performed on obtained color-fundus-image samples, to transform an image parameter of each of the color-fundus-image samples into a preset parameter. As such, color-fundus-image samples have no difference in the above-mentioned differences, thereby improving recognition accuracy of the trained network. The image parameter includes at least one of brightness, saturation, chroma, contrast, or color.

Figure 5:
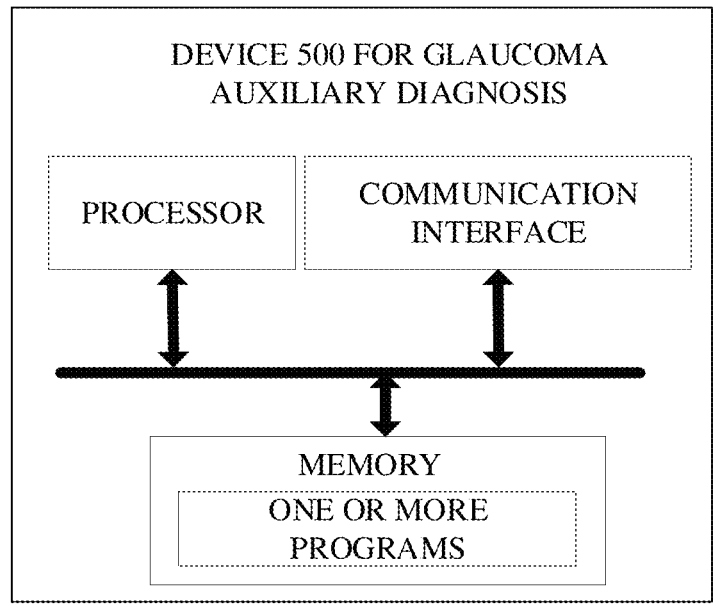
FIG. 5 is a schematic structural diagram illustrating a device for glaucoma auxiliary diagnosis provided in implementations of the disclosure.

FIG. 5 is a schematic structural diagram illustrating a device for glaucoma auxiliary diagnosis provided in implementations of the disclosure. As illustrated in FIG. 5, a device 500 for glaucoma auxiliary diagnosis includes a processor, a memory, a communication interface, and one or more programs. The one or more programs are stored in the memory and configured to be executed by the processor. The programs include instructions which are operable to carry out the following actions. A color fundus image of a patient is obtained. Feature extraction is performed on the color fundus image to obtain a first feature map. Image segmentation is performed on the color fundus image according to the first feature map to obtain an optic disc image in the color fundus image. The optic disc image corresponds to an optic disc area in the color fundus image. Feature extraction is performed on the optic disc image and the color fundus image according to the first feature map, to obtain a probability that the patient has glaucoma.

In one implementation of the disclosure, the programs operable to carry out the actions of performing image segmentation on the color fundus image according to the first feature map to obtain the optic disc image in the color fundus image are operable to carry out the following actions. Image segmentation is performed on the color fundus image according to the first feature map to obtain the optic disc image and an optic cup image in the color fundus image, where the optic cup image corresponds to an optic cup area in the color fundus image. The programs operable to carry out the actions of performing feature extraction on the optic disc image and the color fundus image according to the first feature map to obtain the probability that the patient has glaucoma are operable to carry out the following actions. A ratio of the optic cup image to the optic disc image is determined. Feature extraction is performed on the optic disc image and the color fundus image according to the first feature map to obtain a target probability that the patient has glaucoma. According to the ratio and the target probability, whether the patient has glaucoma is determined.

In one implementation of the disclosure, the programs operable to carry out the actions of performing image segmentation on the color fundus image according to the first feature map to obtain the optic disc image and the optic cup image in the color fundus image are operable to carry out the following actions. Upsampling is performed on the first feature map to obtain a second feature map. Image segmentation is performed according to the second feature map to obtain a first probability segmentation map, a second probability segmentation map, and a third probability segmentation map. The first probability segmentation map is used to represent a probability that each pixel in the color fundus image belongs to the background. The second probability segmentation map is used to represent a probability that each pixel in the color fundus image belongs to optic disc. The third probability segmentation map is used to represent a probability that each pixel in the color fundus image belongs to optic cup. Image segmentation is performed on the color fundus image according to the first probability segmentation map, the second probability segmentation map, and the third probability segmentation map, to obtain the optic disc image and the optic cup image in the color fundus image.

In one implementation of the disclosure, the programs operable to carry out the actions of performing image segmentation on the color fundus image according to the first probability segmentation map, the second probability segmentation map, and the third probability segmentation map to obtain the optic disc image and the optic cup image in the color fundus image are operable to carry out the following actions. Pixels belonging to the background in the color fundus image and pixels belonging to the optic disc in the color fundus image are determined according to the first probability segmentation map and the second probability segmentation map. According to the pixels belonging to the background in the color fundus image and the pixels belonging to the optic disc in the color fundus image, the optic disc image is segmented from the color fundus image. Pixels belonging to the optic cup in the optic disc image are determined according to the second probability segmentation map and the third probability segmentation map. According to the pixels belonging to the optic cup in the optic disc image, the optic cup image is segmented from the optic disc image.

In one implementation of the disclosure, the programs operable to carry out the actions of performing feature extraction on the optic disc image and the color fundus image according to the first feature map to obtain the target probability that the patient has glaucoma are operable to carry out the following actions. The first feature map is mapped to obtain an attention weight matrix. The attention weight matrix has a same dimension as the color fundus image. According to the attention weight matrix, weighting processing is performed on the color fundus image to obtain first input data. A first probability that the patient has glaucoma is determined according to the first input data. A second probability that the patient has glaucoma is determined according to the optic disc image. The target probability that the patient has glaucoma is obtained according to the first probability and the second probability.

In one implementation of the disclosure, the programs operable to carry out the actions of obtaining, according to the first probability and the second probability, the target probability that the patient has glaucoma are operable to carry out the following actions. Weighting processing is performed on the first probability and the second probability to obtain the target probability that the patient has glaucoma.

In one implementation of the disclosure, the programs are further operable to carry out the following actions. Before performing feature extraction on the color fundus image to obtain the first feature map, image transformation is performed on the color fundus image to transform an image parameter of the color fundus image into a standard parameter. The image parameter includes at least one of brightness, saturation, chroma, contrast, or color.

Figure 6:
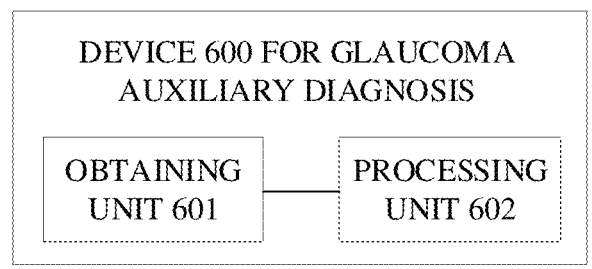
FIG. 6 is a block diagram illustrating functional units of a device for glaucoma auxiliary diagnosis provided in implementations of the disclosure.

FIG. 6 is a block diagram illustrating functional units of a device for glaucoma auxiliary diagnosis provided in implementations of the disclosure. A device 600 for glaucoma auxiliary diagnosis includes an obtaining unit 601 and a processing unit 602. The obtaining unit 601 is configured to obtain a color fundus image of a patient. The processing unit 602 is configured to perform feature extraction on the color fundus image to obtain a first feature map. The processing unit 602 is further configured to perform image segmentation on the color fundus image according to the first feature map to obtain an optic disc image in the color fundus image, where the optic disc image corresponds to an optic disc area in the color fundus image. The processing unit 602 is further configured to perform feature extraction on the optic disc image and the color fundus image according to the first feature map to obtain a probability that the patient has glaucoma.

In one implementation of the disclosure, the processing unit 602 configured to perform image segmentation on the color fundus image according to the first feature map to obtain the optic disc image in the color fundus image is configured to: perform image segmentation on the color fundus image according to the first feature map to obtain the optic disc image and an optic cup image in the color fundus image, where the optic cup image corresponds to an optic cup area in the color fundus image. The processing unit 602 configured to perform feature extraction on the optic disc image and the color fundus image according to the first feature map to obtain the probability that the patient has glaucoma is configured to: determine a ratio of the optic cup image to the optic disc image; perform feature extraction on the optic disc image and the color fundus image according to the first feature map to obtain a target probability that the patient has glaucoma; and determine whether the patient has glaucoma according to the ratio and the target probability.

In one implementation of the disclosure, the processing unit 602 configured to perform image segmentation on the color fundus image according to the first feature map to obtain the optic disc image and the optic cup image in the color fundus image is configured to: perform upsampling on the first feature map to obtain a second feature map; perform image segmentation according to the second feature map to obtain a first probability segmentation map, a second probability segmentation map, and a third probability segmentation map, where the first probability segmentation map is used to represent a probability that each pixel in the color fundus image belongs to the background, the second probability segmentation map is used to represent a probability that each pixel in the color fundus image belongs to optic disc, and the third probability segmentation map is used to represent a probability that each pixel in the color fundus image belongs to optic cup; and perform image segmentation on the color fundus image according to the first probability segmentation map, the second probability segmentation map, and the third probability segmentation map, to obtain the optic disc image and the optic cup image in the color fundus image.

In one implementation of the disclosure, the processing unit 602 configured to perform image segmentation on the color fundus image according to the first probability segmentation map, the second probability segmentation map, and the third probability segmentation map to obtain the optic disc image and the optic cup image in the color fundus image is configured to: determine, according to the first probability segmentation map and the second probability segmentation map, pixels belonging to the background in the color fundus image and pixels belonging to the optic disc in the color fundus image; segment, according to the pixels belonging to the background in the color fundus image and the pixels belonging to the optic disc in the color fundus image, the optic disc image from the color fundus image; determine, according to the second probability segmentation map and the third probability segmentation map, pixels belonging to the optic cup in the optic disc image; and segment, according to the pixels belonging to the optic cup in the optic disc image, the optic cup image from the optic disc image.

In one implementation of the disclosure, the processing unit 602 configured to perform feature extraction on the optic disc image and the color fundus image according to the first feature map to obtain the target probability that the patient has glaucoma is configured to: map the first feature map to obtain an attention weight matrix, where the attention weight matrix has a same dimension as the color fundus image; perform, according to the attention weight matrix, weighting processing on the color fundus image to obtain first input data; determine, according to the first input data, a first probability that the patient has glaucoma; determine, according to the optic disc image, a second probability that the patient has glaucoma; and obtain, according to the first probability and the second probability, the target probability that the patient has glaucoma.

In one implementation of the disclosure, the processing unit 602 configured to obtain, according to the first probability and the second probability, the target probability that the patient has glaucoma is configured to perform weighting processing on the first probability and the second probability to obtain the target probability that the patient has glaucoma.

In one implementation of the disclosure, the processing unit 602 is further configured to perform image transformation on the color fundus image to transform an image parameter of the color fundus image into a standard parameter, before performing feature extraction on the color fundus image to obtain the first feature map corresponding to an image to be recognized. The image parameter includes at least one of brightness, saturation, chroma, contrast, or color.

According to implementations of disclosure, a computer-readable storage medium is further provided. The computer-readable storage medium stores computer programs. The computer programs are operable with a processor to carry out all or part of the operations of the method for glaucoma auxiliary diagnosis described in the foregoing method implementations.

Optionally, the storage medium of the disclosure, such as the computer-readable storage medium, is a non-transitory storage medium or a transitory storage medium.

According to implementations of disclosure, a computer program product is further provided. The computer program product includes a non-transitory computer-readable storage medium configured to store computer programs. The computer programs are operable with a computer to carry out all or part of the operations of the method for glaucoma auxiliary diagnosis described in the foregoing method implementations.

The device for glaucoma auxiliary diagnosis of the disclosure may include a smart phone (such as an Android phone, an iOS phone, a Windows Phone, or the like), a tablet PC, a palmtop, a laptop, a mobile Internet device (MID), or a wearable device. The above-mentioned terminals are merely illustrative and not exhaustive, including but not limited to the device for glaucoma auxiliary diagnosis. In practice, the device for glaucoma auxiliary diagnosis may also include an intelligent on-board terminal, computer equipment, or the like.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software program module.

The integrated unit may be stored in a computer-readable memory when it is implemented in the form of a software program module and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations of the method described in the various implementations of the disclosure. The memory includes various medium capable of storing program codes, such as a universal serial bus (USB), a read-only memory (ROM), a random access memory (RAM), a removable hard disk, disk, compact disc (CD), or the like.

It will be understood by those of ordinary skill in the art that all or part of the operations of the method of the implementations described above may be accomplished by means of a program to instruct associated hardware, the program may be stored in a computer-readable memory, which may include a flash memory, a ROM, a RAM, disk or CD, and so on.

While the principles and the implementations of the disclosure have been described in connection with illustrative examples, it is to be understood that foregoing implementations are merely used to help understand the method and the core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. A method for glaucoma auxiliary diagnosis, comprising:
    obtaining a color fundus image of a patient; performing feature extraction on the color fundus image to obtain a first feature map; performing image segmentation on the color fundus image according to the first feature map to obtain an optic disc image in the color fundus image, the optic disc image corresponding to an optic disc area in the color fundus image; and
    performing feature extraction on the optic disc image and the color fundus image according to the first feature map to obtain a probability that the patient has glaucoma; before performing feature extraction on the color fundus image to obtain the first feature map, performing image transformation on the color fundus image to transform an image parameter of the color fundus image into a standard parameter, wherein the image parameter comprises at least one of brightness, saturation, chroma, contrast, or color.

2. The method of claim 1, wherein
performing image segmentation on the color fundus image according to the first feature map to obtain the optic disc image in the color fundus image comprises:
    performing image segmentation on the color fundus image according to the first feature map to obtain the optic disc image and an optic cup image in the color fundus image, wherein the optic cup image corresponds to an optic cup area in the color fundus image; and
performing feature extraction on the optic disc image and the color fundus image according to the first feature map to obtain the probability that the patient has glaucoma comprises:
    determining a ratio of the optic cup image to the optic disc image;
    performing feature extraction on the optic disc image and the color fundus image according to the first feature map to obtain a target probability that the patient has glaucoma; and
    obtaining, according to the ratio and the target probability, the probability that the patient has glaucoma.

3. The method of claim 2, wherein performing image segmentation on the color fundus image according to the first feature map to obtain the optic disc image and the optic cup image in the color fundus image comprises:
    performing upsampling on the first feature map to obtain a second feature map;
    performing image segmentation according to the second feature map to obtain a first probability segmentation map, a second probability segmentation map, and a third probability segmentation map, wherein the first probability segmentation map is used to represent a probability that each pixel in the color fundus image belongs to the background, the second probability segmentation map is used to represent a probability that each pixel in the color fundus image belongs to optic disc, and the third probability segmentation map is used to represent a probability that each pixel in the color fundus image belongs to optic cup; and
    performing image segmentation on the color fundus image according to the first probability segmentation map, the second probability segmentation map, and the third probability segmentation map, to obtain the optic disc image and the optic cup image in the color fundus image.

4. The method of claim 3, wherein perform image segmentation on the color fundus image according to the first probability segmentation map, the second probability segmentation map, and the third probability segmentation map to obtain the optic disc image and the optic cup image in the color fundus image comprises:
    determining, according to the first probability segmentation map and the second probability segmentation map, pixels belonging to the background in the color fundus image and pixels belonging to the optic disc in the color fundus image;

segmenting, according to the pixels belonging to the background in the color fundus image and the pixels belonging to the optic disc in the color fundus image, the optic disc image from the color fundus image;

determining, according to the second probability segmentation map and the third probability segmentation map, pixels belonging to the optic cup in the optic disc image; and segmenting, according to the pixels belonging to the optic cup in the optic disc image, the optic cup image from the optic disc image.

5. The method of claim 2, wherein performing feature extraction on the optic disc image and the color fundus image according to the first feature map to obtain the target probability that the patient has glaucoma comprises:

mapping the first feature map to obtain an attention weight matrix, wherein the attention weight matrix has a same dimension as the color fundus image;

performing, according to the attention weight matrix, weighting processing on the color fundus image to obtain first input data;

determining, according to the first input data, a first probability that the patient has glaucoma;

determining, according to the optic disc image, a second probability that the patient has glaucoma; and obtaining, according to the first probability and the second probability, the target probability that the patient has glaucoma.

6. The method of claim 5, wherein obtaining, according to the first probability and the second probability, the target probability that the patient has glaucoma comprises:

perform weighting processing on the first probability and the second probability to obtain the target probability that the patient has glaucoma.

7. A device for glaucoma auxiliary diagnosis, comprising: a processor; a memory; a communication interface; and one or more programs, stored in the memory and configured to be executed by the processor; the one or more programs causing the processor to: obtain a color fundus image of a patient; perform feature extraction on the color fundus image to obtain a first feature map; perform image segmentation on the color fundus image according to the first feature map to obtain an optic disc image in the color fundus image, the optic disc image corresponding to an optic disc area in the color fundus image; and perform feature extraction on the optic disc image and the color fundus image according to the first feature map to obtain a probability that the patient has glaucoma; wherein the processor configured to perform image segmentation on the color fundus image according to the first feature map to obtain the optic disc image in the color fundus image is configured to:

perform image segmentation on the color fundus image according to the first feature map to obtain the optic disc image and an optic cup image in the color fundus image, wherein the optic cup image corresponds to an optic cup area in the color fundus image; and the processor configured to perform feature extraction on the optic disc image and the color fundus image according to the first feature map to obtain the probability that the patient has glaucoma is configured to: determine a ratio of the optic cup image to the optic disc image; perform feature extraction on the optic disc image and the color fundus image according to the first feature map to obtain a target probability that the patient has glaucoma; and obtain, according to the ratio and the target probability, the probability that the patient has glaucoma.

8. The device of claim 7, wherein the processor configured to perform image segmentation on the color fundus image according to the first feature map to obtain the optic disc image and the optic cup image in the color fundus image is configured to:

perform upsampling on the first feature map to obtain a second feature map;

perform image segmentation according to the second feature map to obtain a first probability segmentation map, a second probability segmentation map, and a third probability segmentation map, wherein the first probability segmentation map is used to represent a probability that each pixel in the color fundus image belongs to the background, the second probability segmentation map is used to represent a probability that each pixel in the color fundus image belongs to optic disc, and the third probability segmentation map is used to represent a probability that each pixel in the color fundus image belongs to optic cup; and perform image segmentation on the color fundus image according to the first probability segmentation map, the second probability segmentation map, and the third probability segmentation map, to obtain the optic disc image and the optic cup image in the color fundus image.

9. The device of claim 8, wherein the processor configured to perform image segmentation on the color fundus image according to the first probability segmentation map, the second probability segmentation map, and the third probability segmentation map to obtain the optic disc image and the optic cup image in the color fundus image is configured to:

determine, according to the first probability segmentation map and the second probability segmentation map, pixels belonging to the background in the color fundus image and pixels belonging to the optic disc in the color fundus image;

segment, according to the pixels belonging to the background in the color fundus image and the pixels belonging to the optic disc in the color fundus image, the optic disc image from the color fundus image;

determine, according to the second probability segmentation map and the third probability segmentation map, pixels belonging to the optic cup in the optic disc image; and segment, according to the pixels belonging to the optic cup in the optic disc image, the optic cup image from the optic disc image.

10. The device of claim 7, wherein the processor configured to perform feature extraction on the optic disc image and the color fundus image according to the first feature map to obtain the target probability that the patient has glaucoma is configured to:

map the first feature map to obtain an attention weight matrix, wherein the attention weight matrix has a same dimension as the color fundus image;

perform, according to the attention weight matrix, weighting processing on the color fundus image to obtain first input data;

determine, according to the first input data, a first probability that the patient has glaucoma;

determine, according to the optic disc image, a second probability that the patient has glaucoma; and obtain, according to the first probability and the second probability, the target probability that the patient has glaucoma.

11. The device of claim 10, wherein the processor configured to obtain, according to the first probability and the second probability, the target probability that the patient has glaucoma is configured to:
perform weighting processing on the first probability and the second probability to obtain the target probability that the patient has glaucoma.

12. The device of claim 7, wherein the processor is further configured to:
before performing feature extraction on the color fundus image to obtain the first feature map,
perform image transformation on the color fundus image to transform an image parameter of the color fundus image into a standard parameter, wherein the image parameter comprises at least one of brightness, saturation, chroma, contrast, or color.

13. A non-transitory computer-readable storage medium, storing computer programs which, when executed by a processor, cause the processor to carry out the following actions: obtaining a color fundus image of a patient; performing feature extraction on the color fundus image to obtain a first feature map; performing image segmentation on the color fundus image according to the first feature map to obtain an optic disc image in the color fundus image, the optic disc image corresponding to an optic disc area in the color fundus image; and performing feature extraction on the optic disc image and the color fundus image according to the first feature map to obtain a probability that the patient has glaucoma; wherein the computer programs further cause the processor to carry out the following actions: before performing feature extraction on the color fundus image to obtain the first feature map, performing image transformation on the color fundus image to transform an image parameter of the color fundus image into a standard parameter, wherein the image parameter comprises at least one of brightness, saturation, chroma, contrast, or color.

14. The non-transitory computer-readable storage medium of claim 13, wherein
the computer programs causing the processor to carry out the actions of performing image segmentation on the color fundus image according to the first feature map to obtain the optic disc image in the color fundus image cause the processor to carry out the following actions:
performing image segmentation on the color fundus image according to the first feature map to obtain the optic disc image and an optic cup image in the color fundus image, wherein the optic cup image corresponds to an optic cup area in the color fundus image; and
the computer programs causing the processor to carry out the actions of performing feature extraction on the optic disc image and the color fundus image according to the first feature map to obtain the probability that the patient has glaucoma cause the processor to carry out the following actions:
determining a ratio of the optic cup image to the optic disc image;
performing feature extraction on the optic disc image and the color fundus image according to the first feature map to obtain a target probability that the patient has glaucoma; and
obtaining, according to the ratio and the target probability, the probability that the patient has glaucoma.

15. The non-transitory computer-readable storage medium of claim 14, wherein the computer programs causing the processor to carry out the actions of performing image segmentation on the color fundus image according to the first feature map to obtain the optic disc image and the optic cup image in the color fundus image cause the processor to carry out the following actions:
performing upsampling on the first feature map to obtain a second feature map;
performing image segmentation according to the second feature map to obtain a first probability segmentation map, a second probability segmentation map, and a third probability segmentation map, wherein the first probability segmentation map is used to represent a probability that each pixel in the color fundus image belongs to the background, the second probability segmentation map is used to represent a probability that each pixel in the color fundus image belongs to optic disc, and the third probability segmentation map is used to represent a probability that each pixel in the color fundus image belongs to optic cup; and
performing image segmentation on the color fundus image according to the first probability segmentation map, the second probability segmentation map, and the third probability segmentation map, to obtain the optic disc image and the optic cup image in the color fundus image.

16. The non-transitory computer-readable storage medium of claim 15, wherein the computer programs causing the processor to carry out the actions of performing image segmentation on the color fundus image according to the first probability segmentation map, the second probability segmentation map, and the third probability segmentation map to obtain the optic disc image and the optic cup image in the color fundus image cause the processor to carry out the following actions:
determining, according to the first probability segmentation map and the second probability segmentation map, pixels belonging to the background in the color fundus image and pixels belonging to the optic disc in the color fundus image;
segmenting, according to the pixels belonging to the background in the color fundus image and the pixels belonging to the optic disc in the color fundus image, the optic disc image from the color fundus image;
determining, according to the second probability segmentation map and the third probability segmentation map, pixels belonging to the optic cup in the optic disc image; and
segmenting, according to the pixels belonging to the optic cup in the optic disc image, the optic cup image from the optic disc image.

17. The non-transitory computer-readable storage medium of claim 14, wherein the computer programs causing the processor to carry out the actions of performing feature extraction on the optic disc image and the color fundus image according to the first feature map to obtain the target probability that the patient has glaucoma cause the processor to carry out the following actions:
mapping the first feature map to obtain an attention weight matrix, wherein the attention weight matrix has a same dimension as the color fundus image;
performing, according to the attention weight matrix, weighting processing on the color fundus image to obtain first input data;
determining, according to the first input data, a first probability that the patient has glaucoma;

determining, according to the optic disc image, a second probability that the patient has glaucoma; and obtaining, according to the first probability and the second probability, the target probability that the patient has glaucoma.

* * * * *